(12) United States Patent
Tiberghien et al.

(10) Patent No.: US 10,527,214 B2
(45) Date of Patent: Jan. 7, 2020

(54) COUPLING AND HYDRAULIC BRAKING CIRCUIT FOR CYCLE INCORPORATING SUCH A COUPLING

(71) Applicant: STAUBLI FAVERGES, Faverges (FR)

(72) Inventors: Alain-Christophe Tiberghien, Sevrier (FR); Christophe Durieux, Gilly sur Isere (FR); Florian Mille, Faverges (FR)

(73) Assignee: STAUBLI FAVERGES, Faverges (FR)

( * ) Notice: Subject to any disclaimer, the term of this patent is extended or adjusted under 35 U.S.C. 154(b) by 135 days.

(21) Appl. No.: 15/715,699

(22) Filed: Sep. 26, 2017

(65) Prior Publication Data

US 2018/0087699 A1    Mar. 29, 2018

(30) Foreign Application Priority Data

Sep. 28, 2016  (FR) .................................... 16 59153

(51) Int. Cl.
*F16L 37/23* (2006.01)
*F16L 37/084* (2006.01)
*F16L 37/38* (2006.01)

(52) U.S. Cl.
CPC ........... *F16L 37/23* (2013.01); *F16L 37/0844* (2013.01); *F16L 37/38* (2013.01); *Y10T 137/87957* (2015.04)

(58) Field of Classification Search
CPC ..... F16L 137/23; F16L 37/0844; F16L 37/32; F16L 37/34; F16L 37/38; Y10T 137/87957
See application file for complete search history.

(56) References Cited

U.S. PATENT DOCUMENTS

| 3,650,507 | A | * | 3/1972 | Nyberg | ................. | F16L 37/413 |
| | | | | | | 251/149.6 |
| 4,005,847 | A | * | 2/1977 | Ekman | .................... | F16L 37/23 |
| | | | | | | 251/148 |
| 4,026,323 | A | * | 5/1977 | Goodlaxson | ............ | D06F 39/08 |
| | | | | | | 137/562 |
| 4,213,482 | A | * | 7/1980 | Gondek | ................. | F16L 37/23 |
| | | | | | | 137/614.01 |

(Continued)

FOREIGN PATENT DOCUMENTS

| DE | 202012011691 U1 | 1/2014 |
| FR | 2129415 A5 | 10/1972 |
| GB | 1291752 A | 10/1972 |

OTHER PUBLICATIONS

International Search Report From FR1659153 From Which This Application Claims Priority.

*Primary Examiner* — Eric Keasel
*Assistant Examiner* — Kevin R Barss

(57) ABSTRACT

This coupling (R) comprises a male element (A) with a stepped outer groove (20), a female element (B) with locking balls (7), a locking ring (9) provided with a front inner notch and a rear inner notch axially separated by an inner rim, a spring that pushes the locking ring (9) back into the forward position, and a valve movable in the female element (B) and pushed by a spring (14) back to the closed position. The male element (A) comprises a valve movable in an inner channel (200) of the male element (A) and a spring (48) that pushes the valve of the male element (A) back toward a closed position of the inner channel (200).

18 Claims, 10 Drawing Sheets

(56) References Cited

U.S. PATENT DOCUMENTS

| | | | | |
|---|---|---|---|---|
| 4,219,048 A | * | 8/1980 | Ekman | F16L 37/23 137/614.03 |
| 4,269,389 A | * | 5/1981 | Ekman | F16L 37/23 137/614.03 |
| 4,289,164 A | * | 9/1981 | Ekman | F16L 37/23 137/614.03 |
| 4,350,321 A | * | 9/1982 | Berg | F16L 37/23 137/614.03 |
| 5,255,699 A | | 10/1993 | Herzan et al. | |
| 5,316,033 A | * | 5/1994 | Schumacher | F16L 37/23 137/614 |
| 8,046,149 B2 | * | 10/2011 | Nanri | B60T 8/1706 701/70 |
| 2014/0174577 A1 | * | 6/2014 | Tiberghien | F16L 55/10 137/798 |
| 2014/0264118 A1 | * | 9/2014 | Tiberghien | F16L 37/086 251/148 |

* cited by examiner

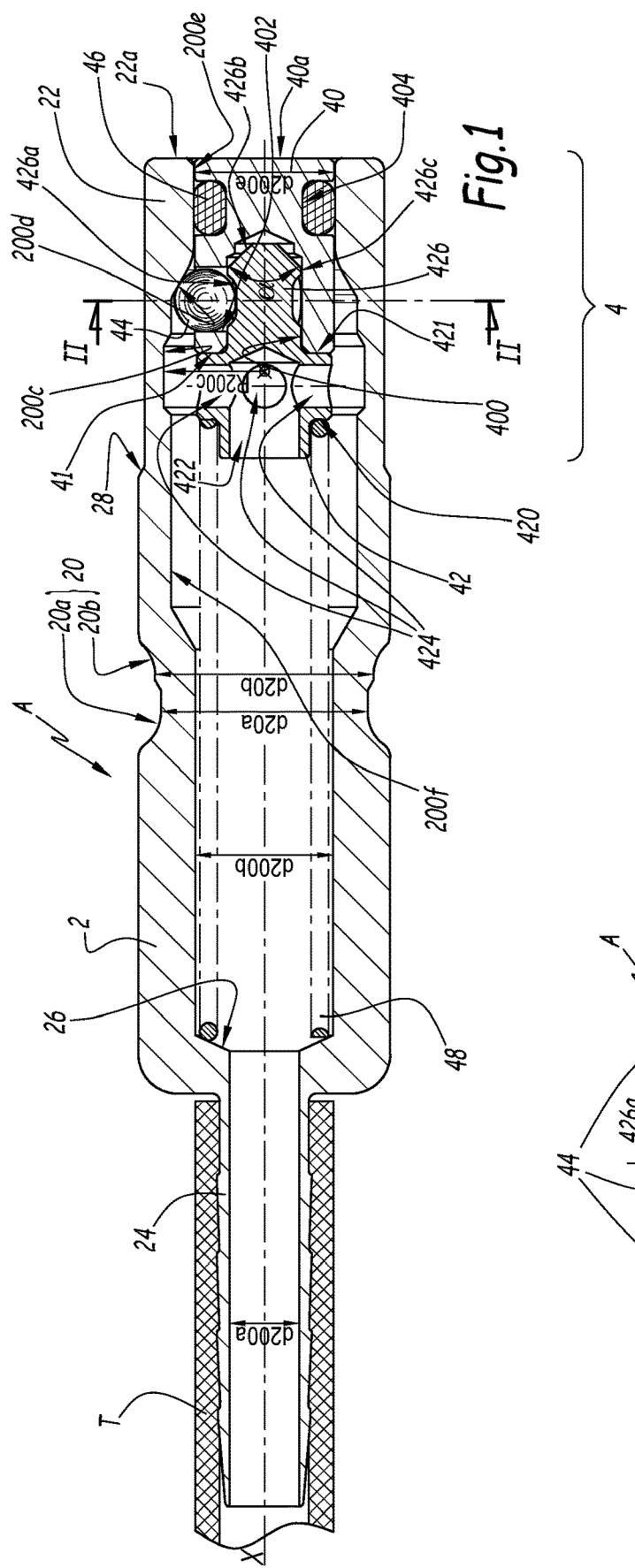
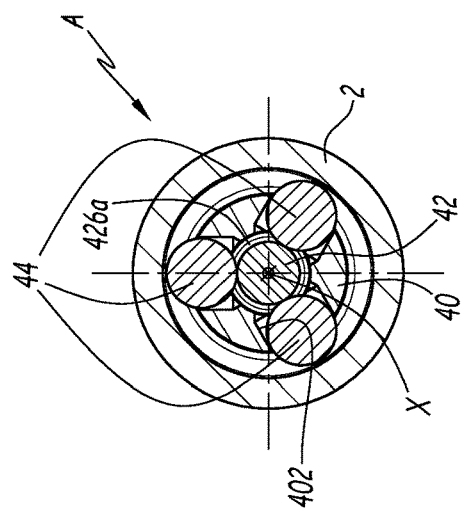

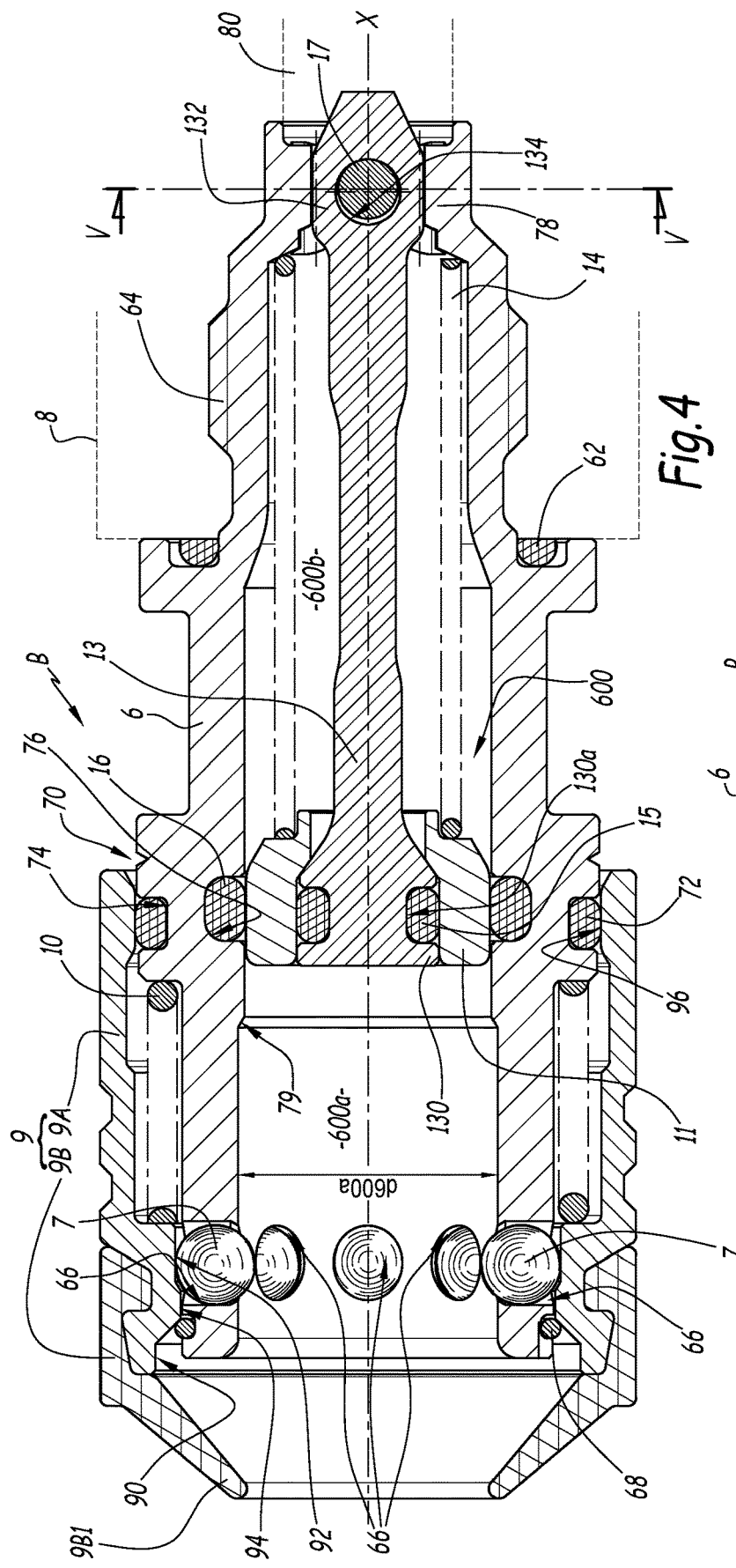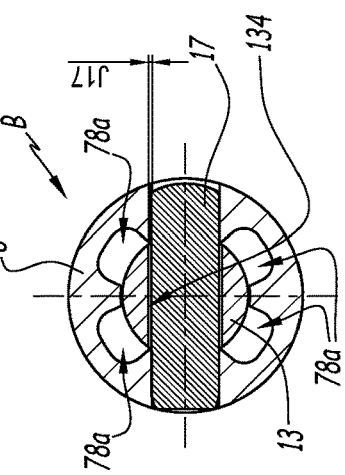
Fig.4
Fig.5

COUPLING AND HYDRAULIC BRAKING CIRCUIT FOR CYCLE INCORPORATING SUCH A COUPLING

BACKGROUND OF THE INVENTION

The invention relates to a coupling for joining fluid pipes, as well as a hydraulic braking circuit for a cycle incorporating such a coupling. A cycle refers to a vehicle with two to three wheels, such as a bicycle or a motorcycle.

It is known from FR 2,129,415 to secure the coupled configuration of a coupling by arranging, on the male element, a stepped outer annular groove with a front portion and a rear portion to cooperate with locking balls of the female element. The female element further comprises a drawer movable relative to a fixed central piston and an outer locking ring that is provided with an inner rim arranged longitudinally between two front and rear inner notches with different depths.

The coupling is coupled by inserting the male element into the female element, and it is not necessary to actuate the locking ring toward the rear, since the drawer pushes the balls back into the front notch of the ring, which keeps the locking ring in the retracted position when the female element is uncoupled from the male element. The movement of the male element in the female element moves the drawer, releases the locking ring, and allows the rear portion of the groove of the male element to align itself with the locking balls. The locking ring is then automatically pushed back by its spring, which aligns the rear notch with the locking balls. The male element can be pushed back toward the front of the female element by the fluid passing in the coupling and by the drawer of the female element to be locked with the locking balls inserted radially between the front portion of the groove and the rear notch of the locking ring. In the coupled configuration, the locking ring cannot be retracted because the locking balls longitudinally interfere with the inner rim of the ring and block the movement of the locking ring toward its retracted position.

To uncouple the coupling, it is necessary to push the male element further into the female element. This in fact places the rear portion of the groove across from the balls, which can thus radially free itself from the inner rim, the locking ring then being able to be retracted toward the rear to accommodate the locking balls in the front notch and release the passage for the male element, which can be removed from the female element.

The dual maneuver necessary for uncoupling prevents the coupling from being uncoupled accidentally, for example under the effect of abrupt accelerations.

U.S. Pat. No. 5,255,699 describes a coupling comprising a male element provided with a valve. The valve comprises a front part that bears against a seat of the male body. The front part extends toward the rear by a rod, around which a sealing gasket and a support for a return spring that pushes the valve back into the closed position against the seat are mounted. The presence of the seat, the minimum diameter of which is smaller than the maximum diameter of the front part, the gasket and the support involves assembling the valve via the rear of the male body.

BRIEF SUMMARY OF THE INVENTION

The aim of the invention is to propose a dual maneuver coupling guaranteeing dual closing of the fluid passage, compatible with a very small bulk, around 6 mm, a maximum fluid passage section, limiting dripping during uncoupling and risks of accidental uncoupling.

To that end, the invention relates to a fluid coupling comprising a male element and a female element complementary to the male element, intended to fit in one another along a central axis of the coupling, the male element comprising a male body defining an inner fluid circulation channel, the male body being provided with a circumferential stepped outer groove with a front portion and a rear portion adjacent along the central axis, the diameter of the front portion being larger than the diameter of the rear portion, and the female element comprising:
  a female body defining an inner cavity with a front part able to receive the male body,
  locking balls radially movable in a housing of the female body, between a locking position of the male body in the female body in a coupled configuration of the coupling and an unlocking position in which the locking balls allow the removal of the male body from the female body;
  a locking ring provided with a circumferential front inner notch and a circumferential rear inner notch axially separated by a circumferential inner rim, the locking ring being movable between a forward position, where the rear inner notch keeps the locking balls in the locking position, and a retracted position, where the front inner notch is radially aligned with the locking balls such that the locking balls can reach their unlocking position,
  a spring that pushes the locking ring to the forward position,
  a valve movable in the female body between an open position and a closed position of a rear part of the inner cavity and pushed back by a spring toward its closed position,
when the locking balls cooperate with the front portion of the stepped outer groove of the male body fitted in the female body, the locking balls form an obstacle to the inner rim of the locking ring along the central axis, when the locking balls cooperate with the rear portion of the stepped outer groove, the locking balls are able to be released relative to the inner rim,
  in an intermediate configuration, the locking balls are aligned with the rear portion of the stepped outer groove and the front notch,
  in the coupled configuration of the coupling, the locking balls are engaged with the front portion of the stepped outer groove and the rear inner notch.

This coupling is characterized in that the male element comprises a valve movable in the inner channel of the male body between an open position and a closed position of the inner channel, and a spring that pushes the valve of the male element back toward its closed position, in that the valve of the male element is formed by a front part, a rear part and at least one connecting member that are separate parts, the connecting member being able to abut axially against an inner surface of the inner channel when the valve of the male element is in the closed position of the inner channel, and in that the maximum radial dimensions of the front part, the rear part and the connecting member are smaller than the minimum inner diameter of a cylindrical nozzle surface of the inner channel of the male element, such that the front part, the rear part and the connecting member can be inserted into the inner channel of the male element by the front of the male body.

Owing to the invention, the disconnection of the coupling is secured by the dual maneuver, and there is no leak upon uncoupling, both coupling elements being equipped with valves. The structure of the male element and its valve allows an advantageous assembly of the components of the valve via the front.

According to advantageous, but optional aspects of the invention, such a coupling may incorporate one or more of the following features, considered in any technically allowable combination:

- One of the front part and the rear part of the valve of the male element has an end with a smaller diameter engaged in a bore of the other from among the rear part and the front part, the connecting member being arranged radially outside the end with a smaller diameter.
- The end with a smaller diameter is provided with an outer groove and a flange arranged axially between the outer groove and a final surface of the end with a smaller diameter, while the inner channel includes a circumferential inner slot, the radius of which is greater than or equal to the sum of the outer radius of the flange and the radial dimension of the connecting member and while the part of the valve with a bore has radial through housings emerging in the bore, the connecting member being engaged in the radial housings and in the outer groove when the connecting balls are axially offset from the inner slot.
- The inner slot of the male body is axially offset relative to the connecting members when the valve of the male element is in the closed position of the inner channel.
- The part of the valve provided with the outer groove is the rear part, while the part provided with the radial housings is the front part, and while the spring of the male element pushes the rear part back into axial contact with the front part.
- The end with a smaller diameter ends with a frustoconical surface, the apical angle of which is preferably 90°.
- The male body is formed in a single piece, and the inner diameter of the inner channel at a rear tail of the male body is smaller than the minimum inner diameter of the cylindrical nozzle surface of the inner channel.
- The rear part of the valve of the male element comprises radial orifices and an axial orifice for passage of the fluid as well as a housing for the spring pushing the valve of the male element back toward a closed position of the inner channel.
- The connecting member is formed by balls, preferably three balls regularly distributed around the central axis of the coupling.
- The valve of the female element comprises a drawer translatable in the rear part of the inner cavity of the female body around a central piston housed in the female body, the drawer being suitable for cooperating axially with the male body by contact between a planar face of the drawer and a planar face of the male body, the central piston being suitable for cooperating axially with the valve of the male element by contact between a planar face of the piston and a planar face of the valve of the male element.
- In the respective closed positions of the valve of the male element and the valve of the female element, the planar face of the male body is axially aligned with the planar face of the valve, and the planar face of the drawer is axially aligned with the planar face of the piston.
- The central piston is secured to the female body by a pin extending transversely to the central axis and traversing a rear part of the piston and the female body.
- The male element comprises a sealing gasket arranged radially between the valve of the male element and the male body when the valve of the male element is in the closed position of the inner channel, the sealing gasket preferably being housed in a groove of the valve.
- The female body comprises an axial stop able to cooperate with the male body to limit the fitting movement of the male body in the female body.
- The female body includes an outer thread suitable for screwing of the female element in a frame.
- The central piston is mounted in a four-lobed housing of the female body.

The invention also relates to a hydraulic braking circuit for a cycle, including at least a caliper and a brake lever block, a fluid connecting hose between the caliper and the brake lever block, and at least one coupling as described above for the fluid connection of the hose with the caliper or with the brake lever block.

Owing to the coupling according to the invention, untimely uncoupling of the hydraulic circuit that would lead to a loss of braking is avoided and the uncoupling/coupling maneuvers, necessary for example to regularly purge the hydraulic braking circuit, are facilitated by the quick connection offered by the coupling according to the invention.

BRIEF DESCRIPTION OF THE SEVERAL VIEWS OF THE DRAWING

The invention will be better understood, and other advantages thereof will appear more clearly, in light of the following description of a coupling according to its principle, provided as a non-limiting example in reference to the appended drawings, in which:

FIG. 1 is a longitudinal sectional view of a male element belonging to a coupling according to the invention;

FIG. 2 is a sectional view along plane II in FIG. 1;

FIG. 4 is a longitudinal sectional view of a female element belonging to a coupling according to the invention;

FIG. 5 is a sectional view along plane V in FIG. 4;

DETAILED DESCRIPTION OF THE INVENTION

Figure 3:
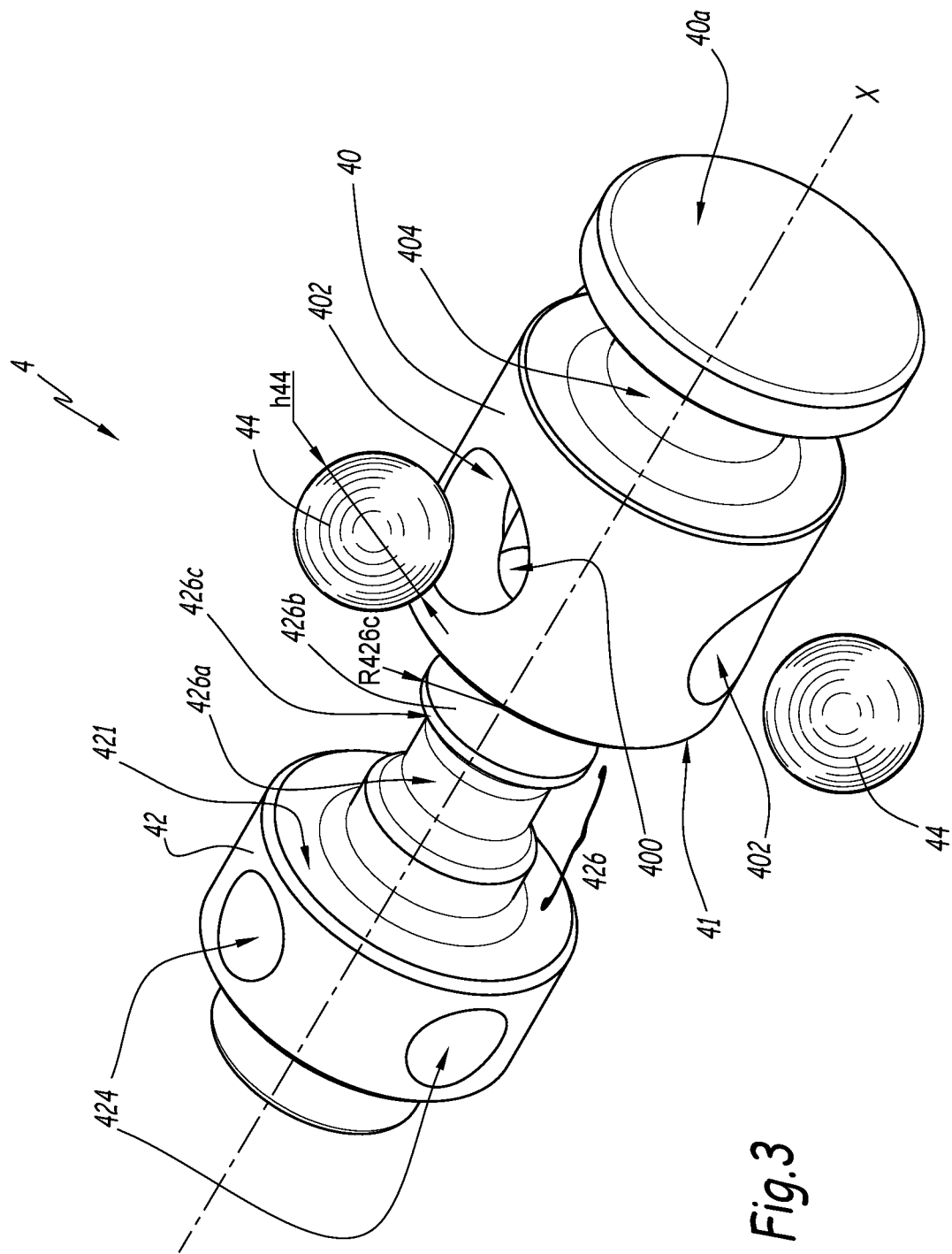
FIG. 3 is an exploded partial perspective view of a valve of the male element of FIG. 1.

FIGS. 1 to 8 show a coupling R for the junction of fluid pipes, comprising a male element A and a female element B.

The male element A is suitable for fitting in the female element B along a fitting direction defined by a longitudinal axis X that forms the central axis of the male element A and the female element B.

Hereinafter, the terms "axial" and "radial" and the adverbs "axially" and "radially" are used in reference to the central axis X of the coupling R. A radial surface is a surface extending parallel to and surrounding the axis X, and an axial surface is a surface perpendicular to the axis X.

For the male element A and the female element B, the front side is that which is respectively oriented on the side of the female element B or the side of the male element A, while the rear side is that which is situated opposite the female element B or the male element A. A "forward" position is a position situated on the front side, and a "retracted" position is a position situated toward the rear.

The adjectives "inner" and "outer" are used in reference to the central axis X for elements respectively oriented toward the central axis X or away from it.

The adjectives "interior" and "exterior" are used in reference to the central axis X for elements respectively found on the side of the central axis X relative to another element or opposite the axis X relative to this other element.

The male element A comprises a single-piece male body 2 comprising a circumferential stepped outer groove 20, a front end 22 with a smaller outer diameter relative to the outer diameter of the body 2 in the area of the outer groove 20, and a rear tail 24. The outer groove 20 comprises a rear portion 20a and a front portion 20b that are adjacent along the axis X, the front portion 20b being on the side of the front end 22. The front portion 20b has an outer diameter d20b at the bottom of the groove larger than the outer diameter d20a at the bottom of the groove of the rear portion 20a.

The rear tail 24 has a cannulated surface for the connection to a fluid connection hose T between the caliper E and a brake lever block 8 of a braking system for a cycle.

The male element A comprises a valve 4 movable in an inner fluid circulation channel 200 completely traversing the male body 2 along the central axis (X). The inner channel 200 is defined by a surface with a smaller diameter d200a reduced at the rear tail 24, an increased diameter d200b at the outer groove 20, a circumferential inner slot 200c arranged from a cylindrical surface 200f extending forward of the diameter d200b and on either side of the slot 200c, a cylindrical nozzle surface 200e with a smaller diameter situated at the front end 22 and an inner frustoconical surface 200d extending from the cylindrical surface 200f arranged on the front with respect to the inner slot 200c up to the cylindrical nozzle surface 200e. The diameter d200a of the rear surface 200a is smaller than the minimum inner diameter d200e of the cylindrical nozzle surface 200e.

The valve 4 is made up of at least four parts or components, including a front part 40, a rear part 42, one or more connecting members, and a sealing gasket 46. In particular, the front part 40, the rear part 42 and the connecting member(s) are separate parts. The front part 40, the rear part 42 are parts of revolution.

A spring 48 is engaged between a bearing surface 26 on the male body 2 and a bearing 420 on the rear part 42. The rear part 42 is provided with an axial orifice 422 and radial orifices 424 allowing the passage of the fluid in the valve 4 in the open configuration. The axial orifice 422 is surrounded by a cylindrical wall around which the spring 48 is engaged.

The front part 40, the rear part 42 and the spring 48 have a maximum outer diameter that is smaller than the minimum inner diameter d200e of the cylindrical nozzle surface 200e, so as to be able to be mounted via the front of the male body 2.

The connecting members are formed by balls 44, of which there are three, and distributed regularly around the central axis X of the coupling R.

The rear part 42 comprises an end 426 with a smaller diameter provided with a circumferential outer groove 426a. The front part 40 has a bore 400 with a diameter larger than the outer diameter of the end 426 with a smaller diameter, and radial through housings 402 emerging in the bore 400. In the configuration of the valve 4 mounted in the male body 2, the end 426 with a smaller diameter is engaged in the bore 400 and the connecting balls 44 are engaged in the housings 402 and arranged radially outside the end 426 with a smaller diameter. The front part 40 and the rear part 42 are axially abutting against one another by direct contact at an axial surface 41 of the front part 40 and an axial surface 421 of the rear part 42.

The diameter of each of the connecting balls 44, which corresponds to the radial height in FIGS. 1 and 2, is smaller than the minimum inner diameter d200e of the inner cylindrical nozzle surface 200e, and in particular half of the minimum inner diameter d200e of the inner cylindrical nozzle surface 200e. This allows the three connecting balls 44 to be introduced into the male body 2 by the front thereof.

The sealing gasket 46 is mounted in a circumferential outer groove 404 of the front part 40 and cooperates with the cylindrical nozzle surface 200e in the closed configuration of the inner channel 200 for sealing between the front part 40 and the so-called "radial" male body 2.

The end 426 bearing the outer groove 426a ends in the forward direction by a final surface that is a frustoconical surface 426b whose radius decreases toward the front of the male element A. The apical angle α of the frustoconical surface 426b is preferably 90°.

When the valve 4 is in the closed position of the inner channel 200, shown in FIG. 1, the inner slot 200c of the male body 2 is axially offset toward the rear of the male body 2 relative to the connecting members 44.

In this position closing off the fluid passage, the connecting balls 44 are axially abutting against the frustoconical surface 200d and engaged in the outer groove 426a.

Between the outer groove 426a and the frustoconical surface 426b, the end 426 comprises a flange 426c forming a radial protuberance relative to the outer groove 426a.

The female element B is shown in FIGS. 4 and 5. The female element B comprises a female body 6 that defines an inner cavity 600 of revolution traversing the female body 6 from front to back. The inner cavity 600 defines a part 600a for accommodating the male body 2 forming a front part of the inner cavity 600 and a fluid flow channel 600b when the coupling R is in the coupled configuration, the flow channel 600b forming a rear part of the inner cavity 600. The accommodation part 600a also forms a nozzle of the female body 6.

The female body 6 is screwed into the brake lever block 8 of the cycle, an inner pipe 80 of which fluidly communicates with the inner cavity 600. A front sealing gasket 62 ensures sealing between the female body 6 and the brake lever block 8. The female body 6 comprises an outer thread 64 allowing the female body 6 to be screwed in the brake lever block 8. Alternatively, the female body 6 is screwed into a braking caliper E of the cycle, an inner pipe of which fluidly communicates with the inner cavity 600.

The female body 6 comprises radial through housings 66 for balls 7 for locking of the male element A in the female element B. The locking balls 7 are radially movable in the housings 66 between a locking position, shown in FIGS. 5 and 8, in which the locking balls 7 partially protrude in the inner pipe 600 and block the passage of the male element 2 in the female body 6, and an unlocking position shown in FIG. 6, in which the locking balls 7 no longer protrude into the inner pipe 600 and free the passage for the male body 2 in the female body 6. This aspect will be developed more specifically later. The geometry of the housings 66 is such that the locking balls 7 are retained in the housings 66 in their radial inward movement.

The female element B also comprises a locking ring 9, comprising a metal body 9A and a polymer body 9B clipped on the metal body 9A at the front thereof. The metal body 9A defines a circumferential front inner notch 90 and a circumferential rear inner notch 92, axially separated by a circumferential inner rim 94. The front inner notch 90 has a diameter larger than the diameter of the rear inner notch 92. The inner rim 94 has a diameter smaller than the inner diameter of the rear inner notch 92 and the diameter of the front inner notch 90. In other words, the front inner notch 90 is deeper with respect to the inner rim 94 than the rear inner notch 92. The locking ring 9 is pushed back toward the front of the female element B, in the forward position abutting against a retainer ring 68, by a spring 10 inserted between the locking ring 9 and the female body 6. In the forward position shown in FIG. 4, the locking ring 9 leaves a mark 70 affixed on the outer surface of the female body 6 visible. The mark 70, when visible, makes it possible to indicate the forward position of the locking ring 9.

The polymer body 9B has a lip 9B1 oriented forward and toward the axis X and that protects the female body 6 in the uncoupled configuration of the coupling R.

An O-ring 72 limits the entries of pollutants between the locking ring 9 and the female body 6. The gasket 72 is mounted in a groove 74 of the female body 6 and cooperates with an inner surface 96 of the metal body 9A.

The female element B comprises a drawer 11 movable in the inner cavity 60 around a central piston 13 extending along the axis X and mounted on the female body 6.

The drawer 11 is pushed back to abut against a flared front part 130 of the piston 13 by a spring 14 bearing against the female body 6. The flared front part 130 comprises an outer radial housing 130a in which a sealing gasket 15 is housed. The gasket 15 provides sealing between the flared front part 130 and an inner surface of the drawer 11. A second sealing gasket 16 is housed in an inner groove 76 of the female body 6 and provides sealing between the female body 6 and an outer surface of the drawer 11. The gaskets 15 and 16 provides sealing between the female body 6, the drawer 11 and the flared front part 130 when the drawer 11 is in the closed position of the flow channel 600b, i.e., abutting on the front against the flared part 130.

The central piston 13 provided with the gasket 15, the spring 14 and the drawer 11 are mounted in the female body 6 via the front side, from the side of the nozzle 600a of the female body 6. The piston 13, the drawer 11 and the spring 14 have a maximum outer diameter that is smaller than the minimum inner diameter d600a of the nozzle 600a of the female body 6. The central piston 13 comprises a rear part 132 secured with the female body 6 in a cylindrical part 78 with a smaller diameter situated at the rear of the female body 6. The rear part 132 is connected to the rear cylindrical part 78 by a transverse pin 17 that traverses the female body 6 and the central piston 13. The pin 17 is mounted gripped without play in the female body 6, while axial play J17, of about 0.1 to 0.5 mm, exists between the pin 17 and a housing 134 of the rear part 132, receiving the pin 17, as shown in FIG. 5. The central piston 13 is therefore secured to the female body 6, to within any axial play J17. The central piston 13 has a variable outer diameter over its length along the axis X.

The drawer 11 forms a valve movable in the female body 6 along the central axis X. The central piston 13 is mounted by its rear part 132 at a four-lobed housing 78a of the rear cylindrical part 78, allowing a maximum passage of fluid between the channel 600b and the inner pipe 80 around the rear part 132.

Figure 6:
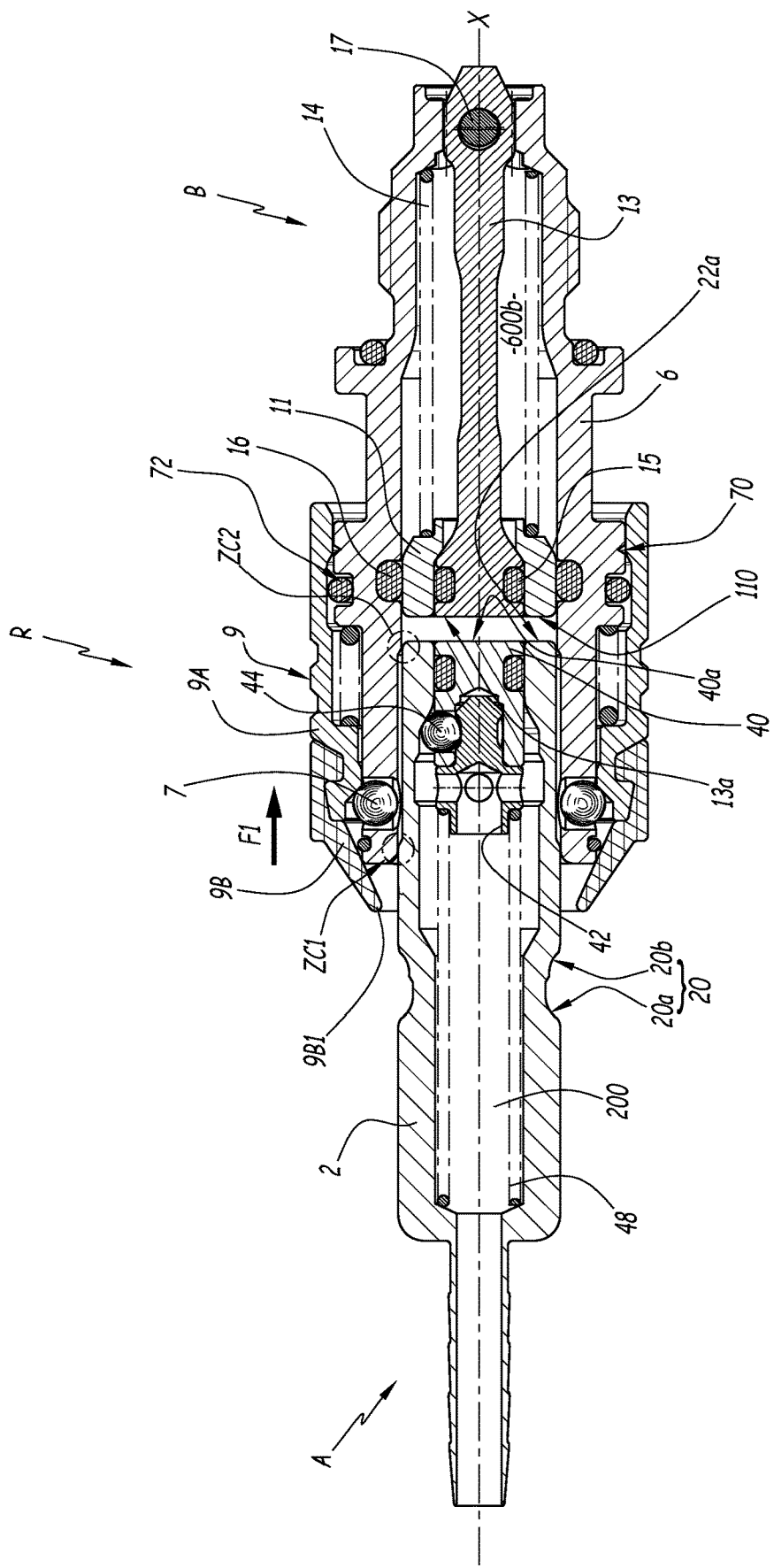
FIG. 6 is a longitudinal sectional view of the male and female elements during a first coupling phase of the coupling.

The coupling R is coupled as follows, in reference to FIGS. 6 to 8. An operator inserts the male element A into the female element B by aligning the male element A and the female element B along the central axis X and inserting the male body 2 into the front part 600a of the inner cavity 600. At the same time, the operator moves the locking ring 9 toward the rear, along the arrow F1. The locking ring 9 enters the retracted position abutting against the male body 2 and the lip 9B1 is outwardly deformed. The mark 70 is then hidden by the metal body 9A. The front inner notch 90 is aligned with the locking balls 7. When the male body 2 is introduced into the female element B, the former is doubly guided with the female body 6 by the quasi-simultaneous guiding engagement at two cylindrical guides zones ZC1 and ZC2, formed by two axially and radially offset inner cylindrical surfaces of the inner cavity 600, respectively complementary to two axially and radially offset cylindrical surfaces of the male body 2.

When the male element A is inserted into the female element B, the valve 4 comes into contact with the central piston 13, and the male body 2 simultaneously comes into contact with the drawer 11. The valve 4 is pushed back into the inner channel 200 as a unit. The contact between the male body 2 and the drawer 11 is done by a planar contact between a planar axial surface 22a of the front end 22 and a planar axial surface 110 of the drawer 11. The contact between the valve 4 and the drawer 13 is done between a planar axial surface 40a of the front part 40 and an opposite planar axial surface 13a of the drawer 13.

Figure 7:
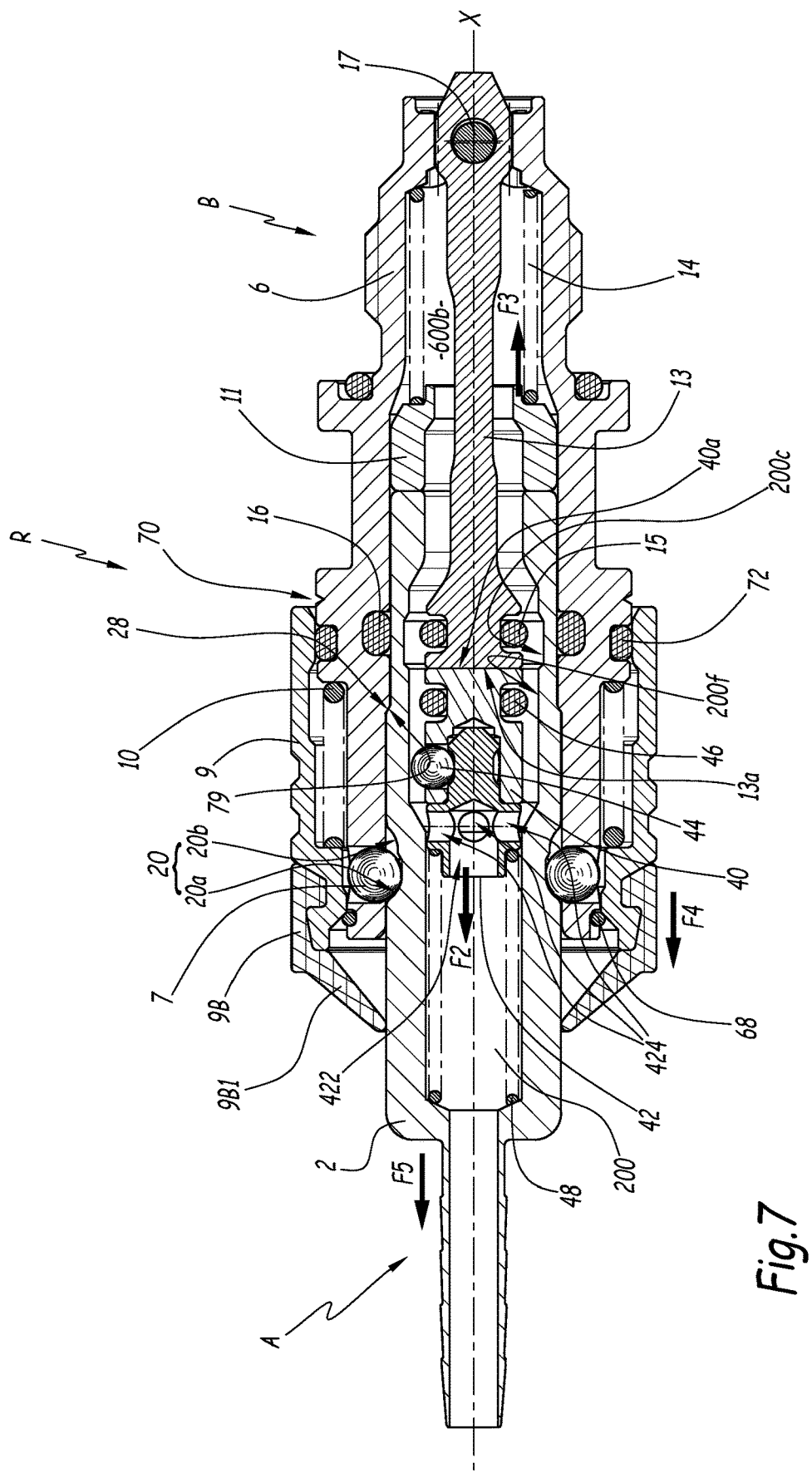
FIG. 7 is a sectional view similar to FIG. 6, corresponding to an intermediate coupling phase of the coupling.
Figure 8:
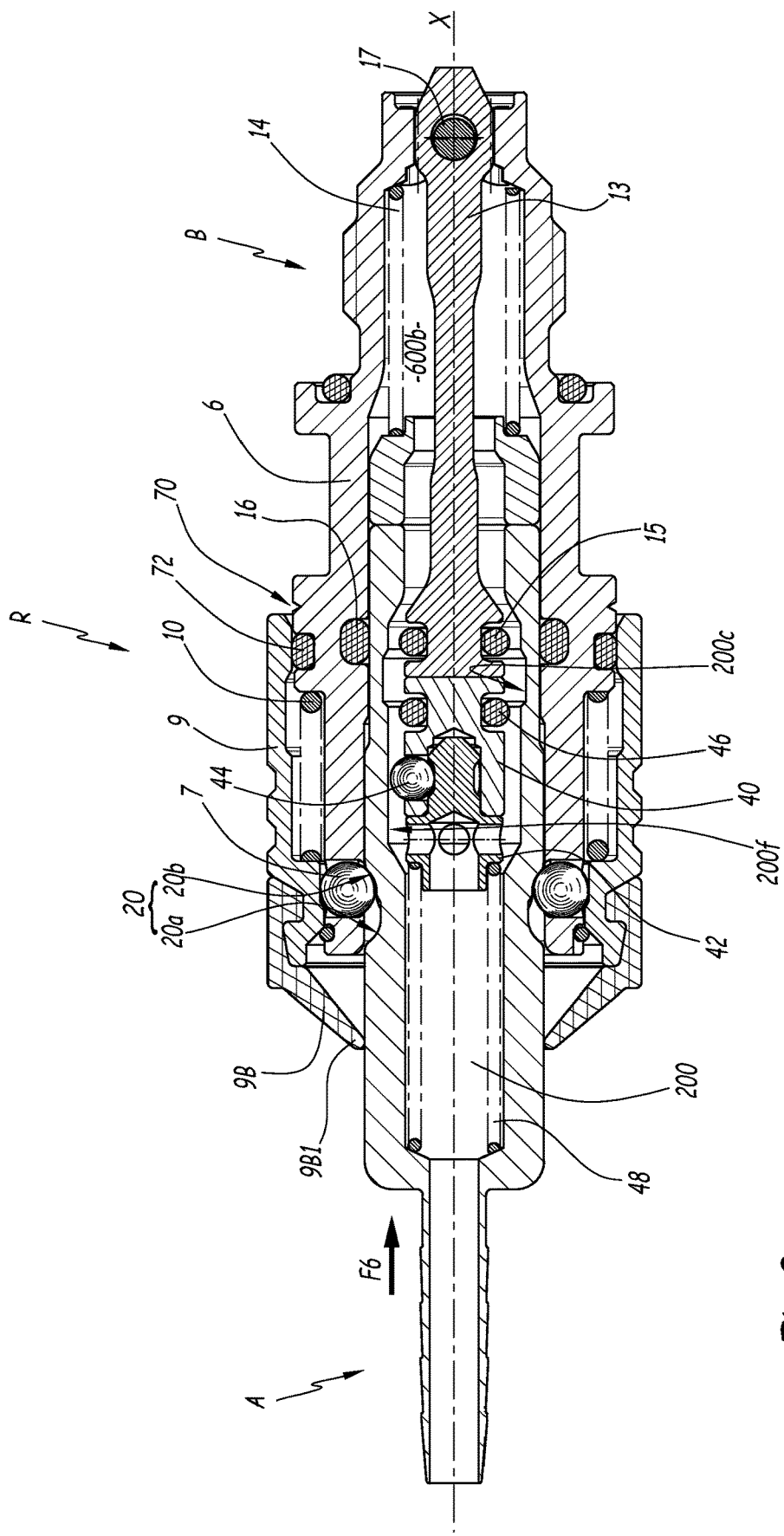
FIG. 8 is a sectional view similar to FIGS. 6 and 7 of the coupling in the coupled configuration.

Continuing the fitting movement of the male element A in the female element B, shown in FIG. 7, respectively pushes the valve 4 and the drawer 11 back into the inner channel 200 and into the channel 600b, along arrows F2 and F3, until the gaskets 46 and 15 respectively lose the sealing with the male body 2 and the drawer 11. In this configuration, the sealing is done between the male body 2 and the female body 6 at the gasket 16. The valve 4 and the drawer 11 are in the open configuration. The circulation of the fluid between the male element A and the female element B is then possible, via the channel 200, the orifices 422 and 424, the space created between the piston 30 and the inner surface of the drawer 11 and the channel 600b.

The connecting balls 44 follow the movement of the valve 4 during the coupling and are movable with the valve 4 in the inner channel 200, surrounded by the cylindrical surface 200f, which has an inner diameter smaller than the inner diameter of the slot 200c, then find themselves radially aligned with the inner slot 200c and lastly, by continuing their movement in the inner channel 200 during the continued insertion of the male element A, again surrounded by the cylindrical surface 200f. In the coupled configuration of the coupling R, the connecting balls 44 are radially aligned with the cylindrical surface 200f and offset relative to the inner slot 200c.

The fitting movement of the male element A toward the rear of the female element B is continued until the male body 2 axially abuts against the female body 6, at the cooperating abutting surfaces 28 and 79 of the male body 2 and the female body 6, respectively.

During the insertion of the male element A, the locking balls 7 are pushed radially back by the male body 2 toward the outside in their unlocking position into the front inner notch 90, which is radially aligned with the balls 7 by the withdrawal toward the rear of the locking ring 9 by the operator. When the male body 2 axially abuts against the female body 6, in an intermediate coupling configuration, the locking balls 7 are radially aligned with the rear portion 20a of the stepped outer groove 20. The operator releases the locking ring 9, which is then pushed back by the spring 10 toward its forward position against the retainer ring 68, along arrow F4, with the lip 9B1 that deforms in contact with the male body 2. The inner rim 94 pushes the locking balls 7 radially toward the inside of the stepped inner groove 20, at the rear portion 20a, in an inner radial position where the locking balls 7 do not axially interfere with the inner rim 94 and allow the locking ring to move toward its forward position. The rear notch 92 then comes radially across from the locking balls 7. The male body 2, released by the operator, is then pushed back toward the front of the female element B along arrow F5 by the pressure exerted by the fluid and/or by the springs 48 and 14, the action of which is exerted via the drawer 11 and the valve 4. The locking balls 7 are radially separated by the front portion 20b of the stepped groove 20, in the rear notch 92, in the configuration of FIG. 8, which corresponds to the coupled configuration of the coupling R. The mark 70 is then visible, marking the coupled configuration of the coupling. In the coupled configuration, the locking balls 7 in the locking position block the male body 2 in the female body 6 by opposing the removal of the male body 2 from the female body 6. The locking balls 7 are radially inserted between the front portion 20b and the rear inner notch 92 such that the locking balls 7 axially interfere with the inner rim 94 and oppose the movement of the locking ring 9 to its retracted position. The locking position of the balls 7 is radially inward relative to their unlocking position. Due to the diameter d20a of the front portion 20a smaller than the diameter d20b of the rear portion 20b, the locking position of the balls 7 is radially outward relative to the inner radial position in which the locking balls 7 cooperate with the rear portion 20a and do not axially interfere with the inner rim 94. In the coupled configuration of the coupling R, the valve 4 and the drawer 11 are in the open position of the inner channel 200, the rear part 600b of the inner cavity 600, respectively. The hose T is fluidly connected to the inner pipe 80 of the brake lever block 8.

To uncouple the coupling R, the reverse operating sequence must be done. The operator must push the male element A toward the rear of the female element B along arrow F6, in the female body 6, so as to radially align the locking balls 7 with the rear portion 20a of the stepped groove 20, so as to be able to push the locking balls 7 radially back toward the inside to free them from the inner rim 94, and to allow maneuvering of the locking ring 9 toward the rear. The operator then actuates the locking ring 9 toward the rear, and radially aligns the inner rim 94, then the front notch 90 with the locking balls 7. The locking balls 7 then being free to be pushed outward in the front notch 90, in the unlocking position in which the locking balls 7 no longer protrude in the inner pipe 600 and allow the male body 2 to be removed from the female body 6, the male element A is pushed back by the action of the springs 48 and 14. The male element A is gradually removed from the female element B, and the return to the closed position of the valve 4 and the drawer 11 under the respective action of the springs 48 and 14 causes resumed sealing of the gaskets 46 and 15 and stopping of the fluid communication between the male element A and the female element B. Once the male element A is completely removed by the operator, the locking ring 9 is next released by the operator and pushed back by the spring 10 in the forward position. The female element B is then ready for a new connection with a male element A.

The valve 4 is mounted in the male body 2 as follows, shown in FIGS. 9 and 10. The male body 2 is engaged with its planar axial surface 22a abutting in a tool 3, which comprises a first bore 30, the diameter of which corresponds to the outer diameter of the male body 2, and a second bore 32 that extends the first bore 30 toward an opposite face of the tool 3. The bores 30 and 32 are centered on the central axis X of the male element A. The second bore 32 has an inner diameter corresponding to the inner diameter d200e of the cylindrical nozzle surface 200e.

The spring 48, then the rear part 42, are inserted into the bore 32, which communicates with the inner channel 200. Then the three connecting balls 44 are engaged in housings 402 of the front part 40, and the front part 40, equipped with the balls 44 and the gasket 46, is inserted into the second bore 32. The rear part 42 and front part 40 are therefore inserted separately into the bore 32. The nozzle of the bore 32 on the side opposite the first bore 30 has an oblique profile 32a allowing gradual crushing of the gasket 46.

Figure 10:
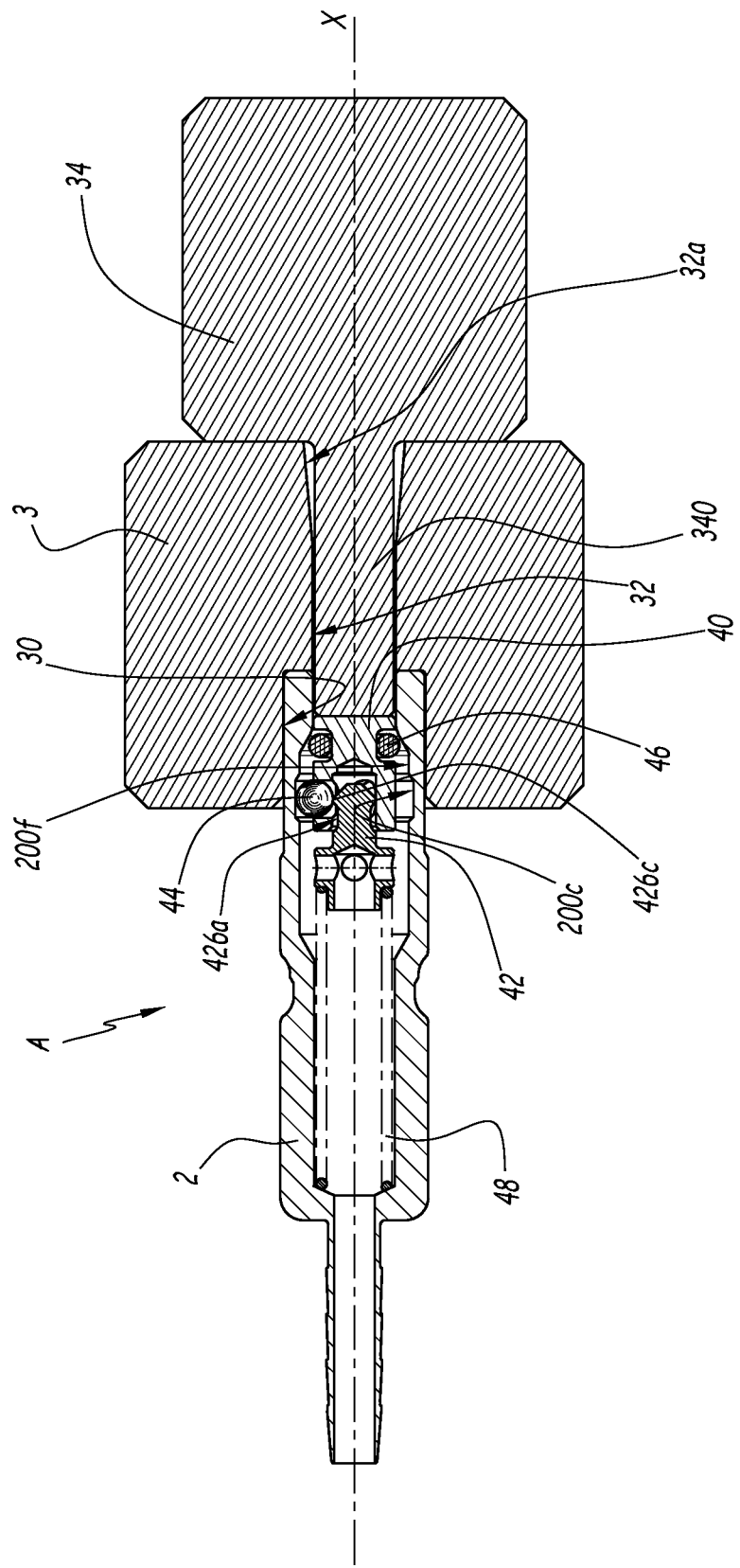
FIG. 10 is a sectional view similar to FIG. 9, showing a second step of assembling the valve.

The rear part 42 and the front part 40, with the frustoconical surface 426b abutting against the connecting balls 44, are pushed, by another tool 34 having a rod 340 with a diameter corresponding to that of the second bore 32, in the male body 2 against the force of the spring 48, through the nozzle of the front end 22 of the male body and the inner space defined by the nozzle surface 200e until the connecting balls 44 are radially aligned with the inner slot 200c, in the configuration of FIG. 10. At that time, the tools 3 and 34 are abutting. The connecting balls 44 have then been radially separated in the slot 200c by the frustoconical surface 426b and by the flange 426c and, under the action of the spring 48, the rear part 42 is pushed back toward the front of the male body 2 such that the balls 44 become housed in the groove 426a of the rear part 42. The configuration of the valve mounted in the male body 2 is reached. The sum of the outer radius R426c of the flange 426c and the radial dimension h44, i.e., the diameter of the connecting balls 44, is smaller than the radius R200c of the inner slot 200c, which allows the connecting balls 44 to cross the flange 426c before engaging in the groove 426a, and is greater than the inner radius of the cylindrical surface 200f, which allows the connecting balls 44 to be kept engaged in the outer groove 426a when the connecting balls 44 are axially offset from the inner slot 200c. The difference between the radius R200c and the maximum outer radius of the front part 40 at the housings 402 is smaller than the radial dimension h44 of the connecting balls 44, such that the connecting balls 44 cannot leave the housings 402 when the valve 4 is in the configuration mounted in the inner channel 200. The sum of the radius of the outer groove 426a and the radial dimension h44 of the connecting balls 44 is greater than half of the diameter d200e, which allows the connecting balls 44 to produce the axial abutment of the valve 4 against the inner frustoconical surface 200d of the male body 2 when the valve 4 is in the position closing off the inner channel 200, but is smaller than the radius of the cylindrical surface 200f.

The tool 34 is removed from the bore 32 and the assembly comprising the front part 42, the rear part 40 and the connecting balls 44 is pushed back toward the front of the male element A by the spring 48, the connecting balls 44 abutting against the frustoconical surface 200*d* and the gasket 46 coming into sealed contact with the inner cylindrical nozzle surface 200*e*. The connecting balls 44 provide the connection of the valve 4 with the male body 2. The rear part 42 is kept by the spring 48 in axial contact against the front part 40 by direct contact, at the axial surfaces 41 and 421. The sealed closed position of the inner channel 200 is reached. When an operator removes the male element A from the tool 3 and places the hose T on the rear tail 24, the male element A is ready to be coupled.

In the configuration of the valve 4 mounted in the male body 2, when the connecting balls 44 are offset from the slot 200*c*, the connecting balls 44 form an obstacle to the axial separation of the front part 40 and the rear part 42 with the connecting balls 44 axially secured to the front part 40 in the housings 402 and kept axially interfering with the flange 426*c* of the rear part 42 by the cylindrical surface 200*f*. In this configuration, the balls 44 are axially secured to the front part 40 and the rear part 42.

The coupling R has a secure disconnection through the required dual maneuver, which consists of pushing the male element A back into the female element B, then retracting the locking ring 9. The two coupling elements being equipped with valves, no leak occurs upon uncoupling.

The male A and female B elements are equipped with valves with planar faces. The planar surfaces 40*a* and 22*a* of the male element A are axially aligned in the closing position when the valve 4 is in the closed position of the inner channel 200, like for the planar surfaces 110 and 13*a* when the drawer 11 is in the closed position of the inner pipe 600, such that no space forms that may retain fluid between the male element A and the female element B during the operation of the coupling R. As a result, no dripping occurs upon uncoupling.

The valve 4 made up of several parts can be mounted via the front of the male element A. In particular, the front part 40, the rear part 42, the connecting balls 44 are inserted into the inner channel 200 of the male element A via the nozzle of the male body 2 at the front end 22 of the male element A.

The assembly of the valve 4 via the front of the male element A makes it possible to produce the male body 2 in a single piece including the rear tail 24 and to obtain a maximal fluid passage in a minimal outer bulk.

The connecting members formed by the connecting balls 44 allow a reduced impact on the passage of the fluid and satisfactory centering of the valve 4 in the mail body 2.

The closed position of the valve 4 is secured by the direct axial contact between the rear part 42 and the front part 40, and by the axial offset that exists between the inner slot 200*c* and the connecting balls 44 in the closing off configuration of the valve 4.

The direct axial contact between the rear part 42 and the front part 40 limits the radial movements of the connecting balls 44 in the housings 402 during the movement of the valve 4 in the male body 2, in particular when the connecting balls 44 are radially aligned with the slot 200*c*.

The gasket 46 that provides the sealing between the valve 4 and the male body 2 provides radial sealing, which increases the fluid passage section relative to front sealing.

The cooperation of the valve 4 with a central piston system 13 and of the drawer 11 with the male body 2 makes it possible to guarantee the axial position of the valve 4 and the drawer 11 respectively in the inner channel 200 and the inner cavity 600 in the coupled configuration, which guarantees a maximal fluid passage.

The assembly of the central piston 13 and the drawer 11 via the front, and the securing of the piston 13 to the female body 6 by the pin 17, makes it possible to produce the female body 6 in a single piece, with smaller radial dimensions and a maximal fluid passage in a minimal outer bulk.

The dual guiding at the two cylindrical guide areas ZC1 and ZC2 undergoing coupling and the abutment of the male body 2 against the female body 6 in maximal coupling travel favors the coupling ergonomics.

Figure 11:
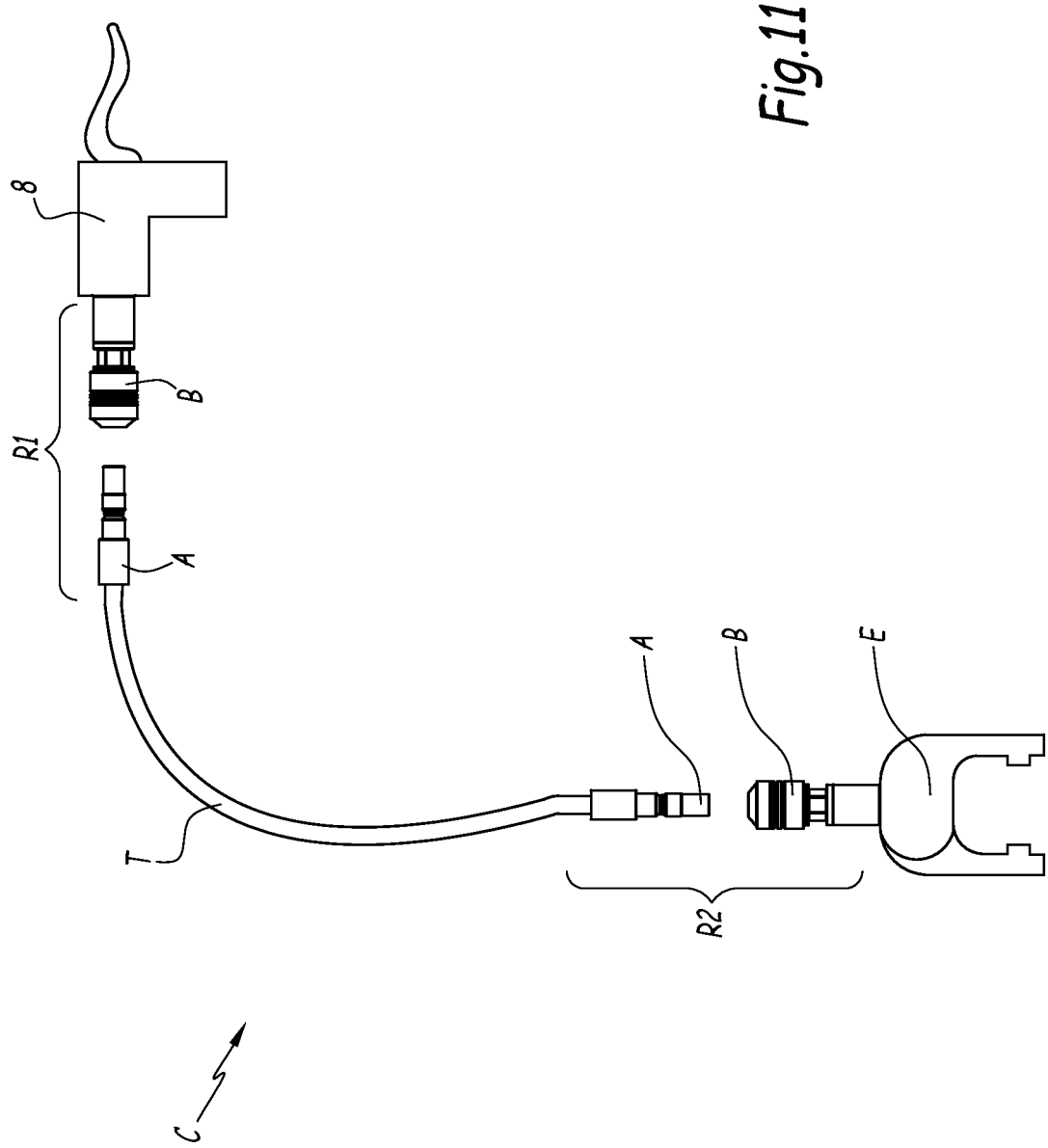
FIG. 11 is a schematic illustration of a hydraulic braking circuit of a cycle according to the invention.

FIG. 11 partially shows a hydraulic braking circuit C for a cycle including the caliper E and the brake lever block 8. In FIG. 11, the circuit is shown disconnected and the hose T is partially shown. The hose T or line provides a fluid connection between the caliper E and the brake lever block 8. The circuit C includes two couplings R1 and R2 according to the invention for coupling the hose T with an inner pipe of the caliper E and with the inner pipe 80 of the brake lever block 8. When the couplings R1 and R2 are in the coupled configuration, the brake fluid, in particular oil, is pushed from the brake lever block 8 into the hydraulic circuit C toward the caliper E in order to actuate brake clips acting on the brake disc of the cycle to cause the cycle to decelerate.

In the couplings R1 and R2, the female element B, which is radially more bulky, is advantageously placed on the end of the inner pipe of the caliper E or the end of the inner pipe 80 of the brake lever block 8, while the male element A, which is less bulky, equips each of the two ends of the hose T. In an alternative that is not shown, the circuit C can comprise a single coupling R providing the connection between the hose T and the brake caliper E or between the hose T and the braking block 8, another coupling being provided for the other end of the hose T and the corresponding element of the braking circuit.

Figure 12:
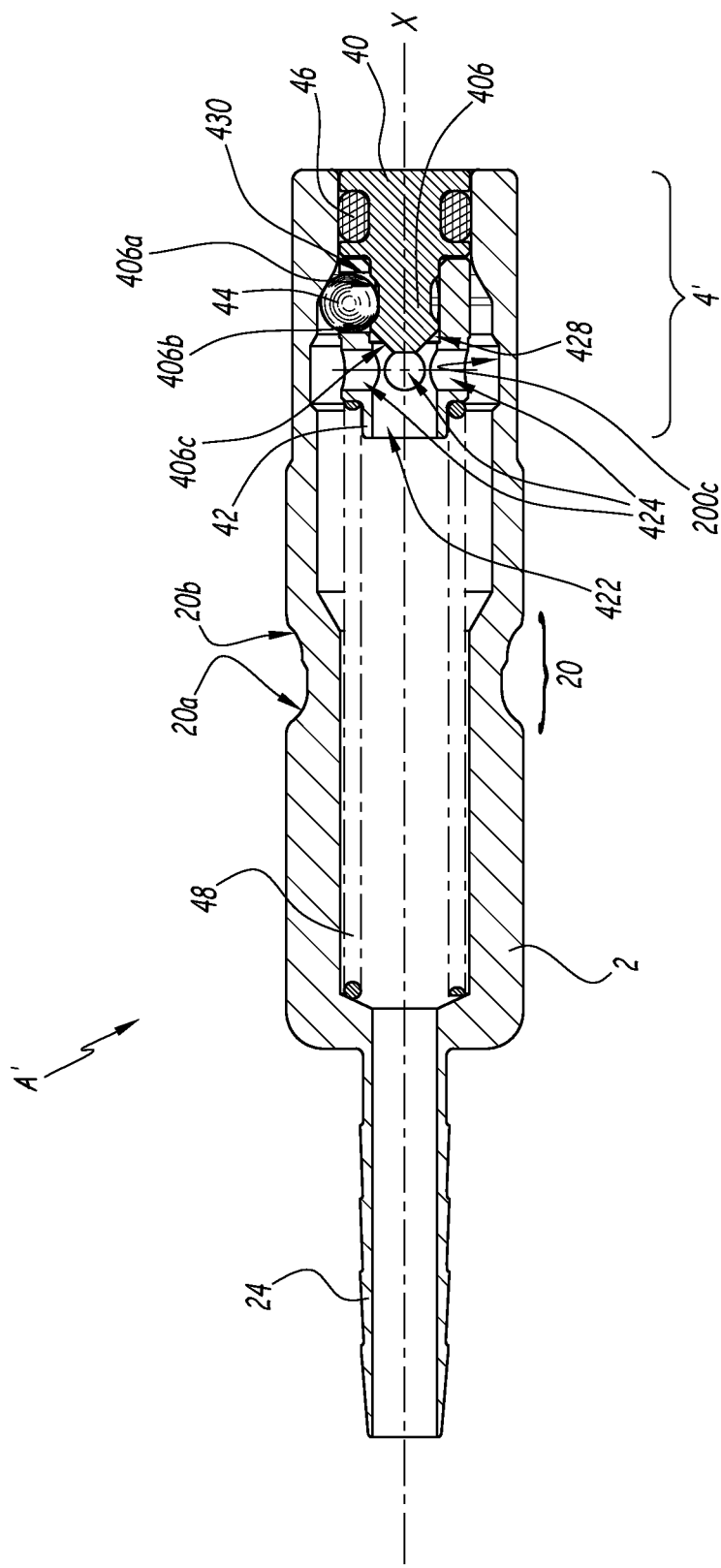
FIG. 12 is a longitudinal sectional view of a male element belonging to a coupling according to a second embodiment of the invention.

A second embodiment of the invention is shown in FIG. 12. In this embodiment, the elements shared with the first embodiment bear the same references and operate in the same manner. Only the differences are outlined below.

In this embodiment, the male element A' comprises a valve 4' whereof the structure is reversed relative to that of the valve 4. The part of the valve 4' provided with the outer groove that cooperates with the connecting balls 44 is the front part 40, while the part provided with the radial housings for the balls 44 is the rear part 42. The front part 40 has a rear end 406 with a smaller diameter having, similarly to the end 426 of the first embodiment, an outer groove 406*a*, a flange 406*b*, and a frustoconical surface 406*c* whereof the diameter becomes smaller toward the rear of the male element A'. A bore 428 and radial through housings 430 are arranged in the rear part 42. The bore 428 extends the axial orifice 422 and receives the rear end 406. The connecting balls 44 are housed in housings 430 and in the outer groove 406*a* in the mounted configuration of the valve 4 in the male body 2.

Figure 9:
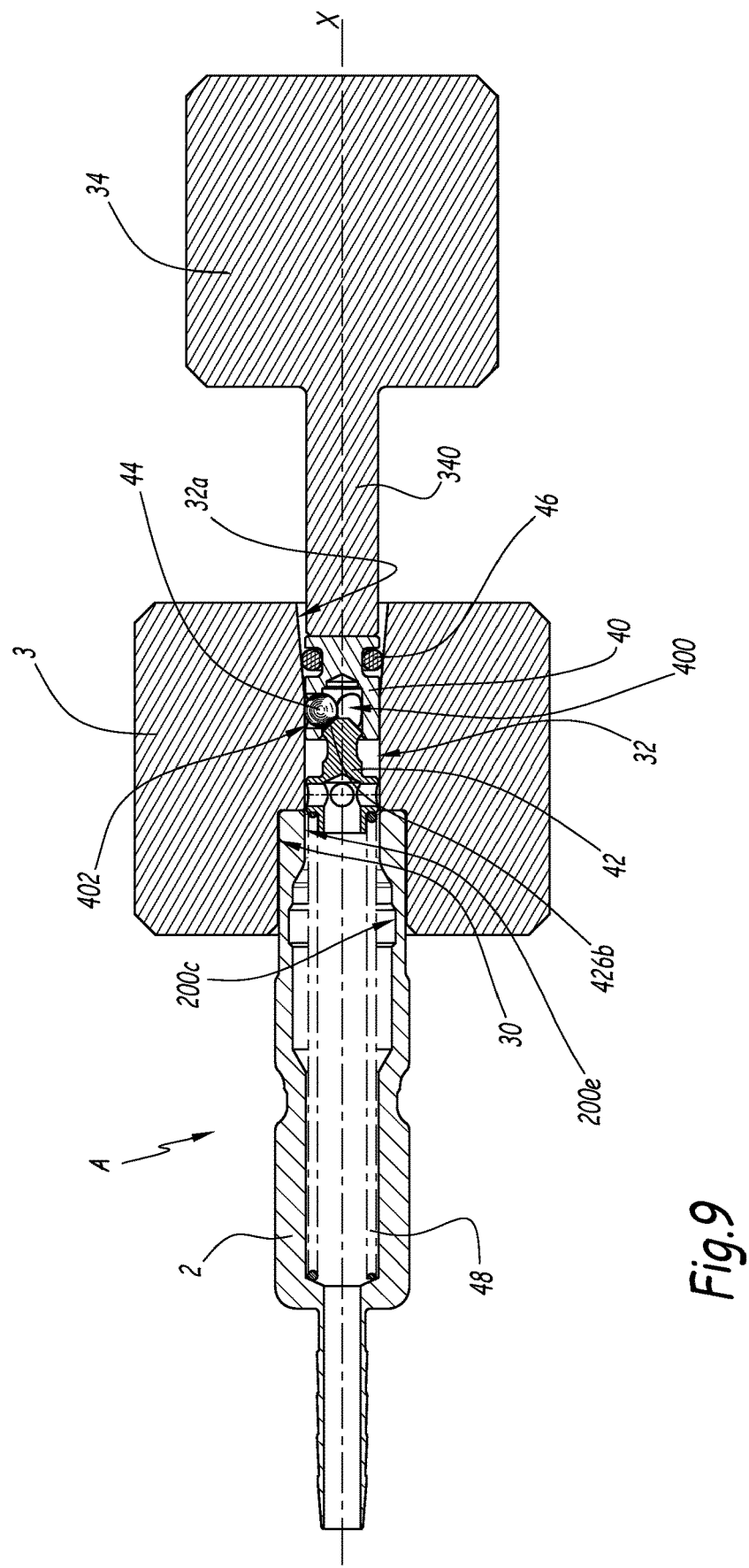
FIG. 9 is a cross-sectional view showing a first step of assembling the valve of FIG. 3 in the male element of FIG. 1.

The process of mounting the valve 4' in the male body 2 is identical in this case to that shown in FIGS. 9 and 10, except that the connecting balls 44 are mounted in their housings 430 and inserted with the rear part 42 into the male body 2, prior to insertion of the front part 40 into the male body 2. Next, the connecting balls 44 are engaged in the groove 406*a* under the joint action of the spring 48, the frustoconical surface 406*c* and the engagement of the front part 40 with the rear part 42 according to a principle similar to that previously described.

According to one embodiment that is not shown, the connecting members between the front part 40 and the rear part 42 can be different from the balls 44, for example bowed segments or a slitted ring.

According to one embodiment that is not shown, the front part and the rear part can be secured axially by screwing or forcible fitting in one another. In this case, the notch and the flange can be omitted on the end with a smaller diameter, the housings for the connecting member(s) can be omitted, the outer surface of the end with a smaller diameter radially cooperating with the connecting member(s).

According to one embodiment that is not shown, the valve 4 is formed by a front part 40, a rear part 42, connecting members, and a spring 48, the gasket 46 being housed on the male body at the cylindrical nozzle surface 200*e*.

The coupling has been described as it applies to cycle braking, but can be implemented for the fluid connection for breathable air or any other fluid requiring a secure uncoupling maneuver and a limited bulk.

The invention claimed is:

1. A fluid coupling comprising a male element and a female element complementary to the male element, intended to fit in one another along a central axis of the coupling,
the male element comprising a male body defining an inner fluid circulation channel, the male body being provided with a circumferential stepped outer groove with a front portion and a rear portion adjacent along the central axis, the diameter of the front portion being larger than the diameter of the rear portion, and
the female element comprising:
a female body defining an inner cavity with a front part able to receive the male body,
locking balls radially movable in a housing of the female body, between a locking position of the male body in the female body in a coupled configuration of the coupling and an unlocking position in which the locking balls allow the removal of the male body from the female body;
a locking ring provided with a circumferential front inner notch and a circumferential rear inner notch axially separated by a circumferential inner rim, the locking ring being movable between a forward position, where the rear inner notch keeps the locking balls in the locking position, and a retracted position, where the front inner notch is radially aligned with the locking balls such that the locking balls can reach their unlocking position,
a spring that pushes the locking ring to the forward position,
a valve movable in the female body between an open position and a closed position of a rear part of the inner cavity and pushed back by a spring toward its closed position,
when the locking balls cooperate with the front portion of the stepped outer groove of the male body fitted in the female body, the locking balls form an obstacle to the inner rim of the locking ring along the central axis, when the locking balls cooperate with the rear portion of the stepped outer groove, the locking balls are able to be released relative to the inner rim,
in the coupled configuration of the coupling, the locking balls are engaged with the front portion of the stepped outer groove and the rear inner notch;
wherein the male element comprises a valve movable in the inner channel of the male body between an open position and a closed position of the inner channel, and a spring that pushes the valve of the male element toward the front of the male element toward its closed position,
wherein the valve of the male element is formed by a front part, a rear part and at least one connecting member that are separate parts, the connecting member being able to abut axially against an inner surface of the inner channel when the valve of the male element is in the closed position of the inner channel,
and wherein the maximum radial dimensions of the front part, the rear part and the connecting member are smaller than the minimum inner diameter of a cylindrical nozzle surface of the inner channel of the male element, such that the front part, the rear part and the connecting member can be inserted into the inner channel of the male element by the front of the male body.

2. The coupling according to claim 1, wherein one of the front part and the rear part of the valve of the male element has an end with a smaller diameter engaged in a bore of the other from among the rear part and the front part, the connecting member being arranged radially outside the end with a smaller diameter.

3. The coupling according to claim 2, wherein the end with a smaller diameter is provided with an outer groove and a flange arranged axially between the outer groove and a final surface of the end with a smaller diameter, wherein the inner channel includes a circumferential inner slot, the radius of which is greater than or equal to the sum of the outer radius of the flange and the radial dimension of the connecting member, and wherein the part of the valve with a bore has radial through housings emerging in the bore, the connecting member being engaged in the radial housings and in the outer groove when the connecting balls are axially offset from the inner slot.

4. The coupling according to claim 3, wherein the inner slot of the male body is axially offset relative to the connecting members when the valve of the male element is in the closed position of the inner channel.

5. The coupling according to claim 3, wherein the part of the valve provided with the outer groove is the rear part, while the part provided with the radial housings is the front part, and wherein the spring of the male element pushes the rear part back into axial contact with the front part.

6. The coupling according to claim 2, wherein the end with a smaller diameter ends with a frustoconical surface, the apical angle of which is preferably 90°.

7. The coupling according to claim 6, wherein an apical angle of the frustoconical surface is 90°.

8. The coupling according to claim 1, wherein the male body is formed in a single piece, and wherein the inner diameter of the inner channel at a rear tail of the male body is smaller than the minimum inner diameter of the cylindrical nozzle surface of the inner channel.

9. The coupling according to claim 1, wherein the rear part of the valve of the male element comprises radial orifices and an axial orifice for passage of the fluid as well as a housing for the spring pushing the valve of the male element back toward its closed position of the inner channel.

10. The coupling according to claim 1, wherein the connecting member is formed by balls.

11. The coupling according to claim 10, wherein the balls are three balls regularly distributed around the central axis of the coupling.

12. The coupling according to claim 1, wherein the valve of the female element comprises a drawer translatable in the rear part of the inner cavity of the female body around a central piston housed in the female body, the drawer being suitable for cooperating axially with the male body by contact between a planar face of the drawer and a planar face of the male body, the central piston being suitable for cooperating axially with the valve of the male element by contact between a planar face of the central piston and a planar face of the valve of the male element.

13. The coupling according to claim 12, wherein on the respective closed positions of the valve of the male element and the valve of the female element, the planar face of the male body is axially aligned with the planar face of the valve, and the planar face of the drawer is axially aligned with the planar face of the piston.

14. The coupling according to claim 12, wherein the central piston is secured to the female body by a pin extending transversely to the central axis and traversing a rear part of the central piston and the female body.

15. The coupling according to claim 1, wherein the male element comprises a sealing gasket arranged radially between the valve of the male element and the male body when the valve of the male element is in the closed position of the inner channel.

16. The coupling according to claim 15, wherein the sealing gasket is housed in a groove of the valve.

17. The coupling according to claim 1, wherein the female body comprises an axial stop able to cooperate with the male body to limit the fitting movement of the male body in the female body.

18. A hydraulic braking circuit for a cycle including at least:
- a caliper and a brake lever block,
- a fluid connection hose between the caliper and the brake lever block, and
- at least one coupling according to claim 1 for the fluid connection of the hose with the caliper or with the brake lever block.

* * * * *